(12) United States Patent
Lee et al.

(10) Patent No.: US 6,484,267 B1
(45) Date of Patent: Nov. 19, 2002

(54) CLOCK GATED BUS KEEPER

(75) Inventors: Hyun Lee, Allentown, PA (US); David W. Potter, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/474,413

(22) Filed: Dec. 29, 1999

(51) Int. Cl.$^7$ .............................. G06F 1/04; G06F 13/38
(52) U.S. Cl. ........................................ 713/600; 710/100
(58) Field of Search .................. 713/600; 710/100, 710/104, 126

(56) References Cited

U.S. PATENT DOCUMENTS

| | | | | |
|---|---|---|---|---|
| 5,511,170 A | * | 4/1996 | Abdoo | 710/100 |
| 5,532,630 A | * | 7/1996 | Waggoner et al. | 327/108 |
| 5,818,884 A | * | 10/1998 | Reymond | 375/354 |
| 5,896,514 A | * | 4/1999 | Spaniol | 710/107 |
| 6,092,212 A | * | 7/2000 | Muljono et al. | 713/600 |

* cited by examiner

Primary Examiner—Thomas M. Heckler
(74) Attorney, Agent, or Firm—Synnestvedt & Lechner LLP

(57) ABSTRACT

The present invention comprises a clocked bus keeper circuit that does not drive the bus during the first half of a clock cycle and then holds the value driven onto the bus during the first half of the clock cycle for the second half of the clock cycle. Accordingly, true data drivers on the bus drive the bus during the first half of the clock cycle without the need to overcome the value driven by the bus keeper, but during the second half of the clock cycle, the bus keeper holds the data driven during the first half of the clock cycle. In this manner, there is no bus contention between the true bus data drivers and the bus keeper.

26 Claims, 1 Drawing Sheet

CLOCK GATED BUS KEEPER

FIELD OF THE INVENTION

The invention pertains to bus keepers. The invention pertains more particularly to bus keepers for buses of system-on-a-chip integrated circuits.

BACKGROUND OF THE INVENTION

The use of busses (e.g., address busses and data busses) to provide a single, data path that is shared by a plurality of data processing devices, such as memories, micro controllers, microprocessors, digital signal processors (DSPs), and peripheral devices is, of course, well known. Busses are most commonly formed on printed circuit boards and interconnect a plurality of devices mounted on the printed circuit board. The busses may also run out to connectors (for instance in a personal computer) in order to allow external devices to be coupled to the bus.

Recently, integrated circuit manufacturers have begun producing single chips containing multiple device cores of the type, e.g., memories, micro controllers, DSPs, and microprocessors, that traditionally were embodied on different chips mounted on a PCB and interconnected by one or more busses that ran on the PCB. Such a chip is commonly termed a system-on-a-chip or SoC.

SoCs also incorporate busses to provide data paths to interconnect the multiple core devices on the chip. The busses on SoCs, however, comprise conductor traces on the chip and thus tend to be much shorter in length and less sensitive to noise than printed circuit board busses. A typical SoC that would include one or more busses might be a SoC including a processor or multiprocessor that connects to several peripheral devices and/or several memory blocks (SRAM, DRAM, PROM and ROM).

Floating nodes occur when no drivers are actively connected to a node, which is a condition that is commonly associated with a node, such as a bus node, that can alternately be driven by a plurality of different devices. When a node is not actively driven, it is connected to power and ground only through the high impedance of non-conducting n and p transistors of the drivers that can drive the bus and the gate inputs of the receiving devices coupled to the bus. The voltage on the receiver input gates can drift to a critical level, $V_{crit}$, that will cause the n and p transistors of the receivers to conduct simultaneously. This establishes a low impedance path between power and ground through the receiving device which can be a source of wasted power and possibly even destruction of the device.

In CMOS technology, the floating node problem exists usually because of one or more of three reasons, namely, (1) design oversight, (2) decoding simplification, and (3) bus turn around time (e.g., null cycles). Design oversight can occur when driver select signals are not decoded to select a default driver for one or more combinations of signal values. Such oversights can be simply a mistake or may occur when a to pre-existing design is modified for a new application and a bus driver that is no longer needed in the new design is removed from the circuit.

Floating node conditions also can be caused when the signals that select a bus driver are intentionally not decoded. This can occur when there is a large number of signals that select the bus driver and the decode logic is simplified by way of not decoding one or more default selections.

Another cause of a floating node condition is bus turn-around time specifications which often are incorporated into designs in order to prevent bus contention. Specifically, when multiple drivers can drive a single node (e.g., a bus bit line), care must be taken in the bus access protocol to prevent two devices from driving the bus simultaneously. One driver must be completely turned off before the next driver is turned on. If one driver is trying to drive the bus to a logic low level while another driver is trying to drive it to a logic high level, a very low impedance path between power and ground can be established which will destroy the device. Bus contention can occur at the point where one bus driver is turning off and another is turning on simultaneously. Specifically, it requires some finite period of time to turn a driver off or on. Differences in the delays of different drivers turning on and off and differences in the skew of the control signals selecting the drivers makes it extremely difficult to ensure that bus contention will not occur if one driver is switched off on the same clock phase that the next driver is switched on. Thus, turning drivers on and off in the same phase of a clock can cause transient bus contention.

Bus turn around time, or null cycle, is a scheme by which driver-to-driver bus contention is prevented. It refers to an allotted period of time in the bus access protocol when all drivers are turned off, i.e., the time between one driver switching off and the next driver switching on. Accordingly, bus protocols commonly include null cycles between switching of drivers on a bus. Null cycles (or bus turn around time) is the most likely source of floating nodes.

While the insertion of null cycles eliminates the problem of bus contention, it creates the potential for floating nodes. For CMOS devices, null cycles are not a significant problem if the null period is relatively short because the load impedance on the bus is high enough that bus capacitance will hold the bus voltage at a valid logic level for several milliseconds. However, for circuits with stopped or slowed clocks or with low impedance loads, the node voltage may have time to drift to a critical voltage, $V_{crit}$.

Accordingly, in both traditional busses and SoC busses, bus keepers (or bus holders) are often incorporated into the design. A bus keeper is a feedback circuit that prevents a node (e.g., a bit of a bus) from floating. The purpose of the bus keeper is to ensure that the bus bits are always driven to a valid logic level and, more particularly, to hold the immediately preceding driven logic level on the line.

The bus driver in the feedback circuit of a conventional bus keeper drives the bus, but with a weaker signal strength than the drivers of the data processing devices. Thus, the previously driven logic level is maintained during null cycles, but when the next data precessing device starts to drive the bus at the end of the null cycle, its strong driver easily overcomes the weak driver of the bus keeper.

These conventional bus keepers have several significant drawbacks. First, because they are essentially bus drivers, they still cause some bus contention, albeit not as bad as the contention between two strong drivers. Nevertheless, the contention causes excess power dissipation, and slower data transitions on the bus. Further, conventional bus keeper designs typically cannot easily be migrated between circuit designs because a conventional bus keeper must be designed with transistors specifically designed and scaled to provide the correct balance relative to the transistors of the strong drivers of the data precessing devices of the particular circuit.

Another well known tactic for preventing floating nodes is to incorporate pull up or pull down resistors on the bus bit lines. However, pull up and pull down resistors also present problems because the resistor values are difficult to guarantee, they waste power, they slow down bus operation, and they do not eliminate null cycles. Further, like bus keeper designs, they may be difficult to migrate the design to different processes and/or operating conditions.

SUMMARY OF THE INVENTION

The present invention comprises a clocked bus keeper circuit that does not drive the bus during the first half of a bus clock cycle, but rather observes and stores the value driven onto the bus during the first half of the clock cycle by one of the data processing drivers. Then, during the second half of the clock cycle, it drives the bus with the value stored during the first half of the bus cycle. Accordingly, a data processing device's driver drives the bus during the first half of the clock cycle without the need to overcome the bus keeper, but during the second half of the clock cycle, the bus keeper holds the data driven during the first half of the clock cycle. In this manner, there is no bus contention between the bus drivers of the data processing devices of the circuit and the bus keeper.

The bus keeper circuit is clocked to turn to a first condition during the first half of the clock cycle in which the data driven onto the bus is developed at a node in the bus keeper. During the second half of the clock cycle, the bus keeper is turned on to drive the stored data onto the bus. As soon as the leading edge of the next clock cycle arrives, the bus keeper is turned off again so as to drive no data onto the bus, but rather store the value driven onto the bus by another device during that half clock cycle.

DETAILED DESCRIPTION OF THE INVENTION

Figure 1:
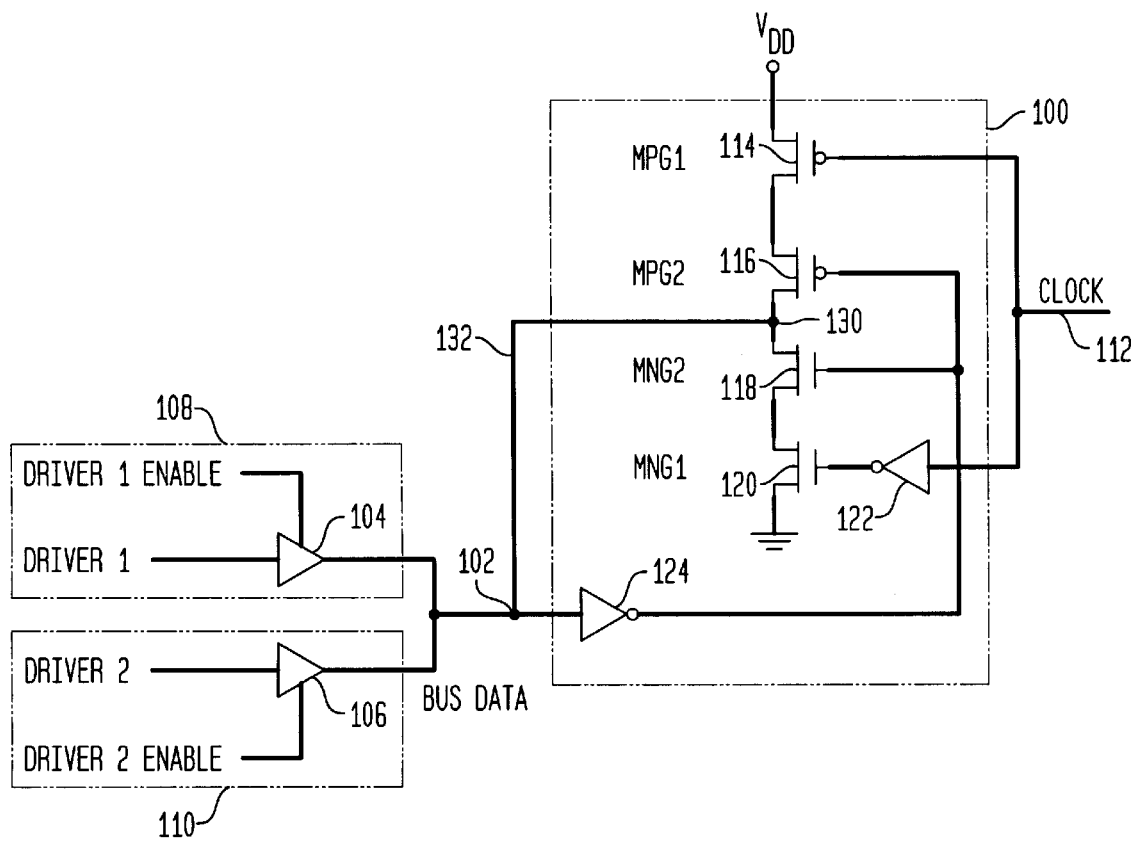
FIG. 1 is a circuit diagram of a circuit including a bus and a bus keeper in accordance with the present invention.

FIG. 1 is a circuit diagram illustrating a bus keeper circuit 100 in accordance with the present invention. FIG. 1 illustrates the circuitry associated with a single bit line of the bus. It should be understood by those of skill in the related arts that a copy of the circuit 100 shown in FIG. 1 is provided for each bit line of the relevant bus. It should also be clear to those of skill in the art that the circuit 100 can be used in connection with any type of bus.

In FIG. 1, a bus bit line is shown at 102. Further, drivers 104 and 106 associated with first and second core devices 108 and 110, respectively, are shown. The bus keeper is clocked by a clock signal 112. Clock 112 runs at the data rate of the bus and, in fact, may be the bus clock. The bus keeper circuit comprises four transistors 114, 116, 118, and 120 and two inverters 122 and 124. Transistors 114 and 120 are complementary. In this exemplary embodiment, transistor 114 is a p-type transistor and transistor 120 is an n-type transistor. The current flow terminals (source and drain) of transistor 114 are coupled between VDD and one of the current flow terminals of transistor 116. The control terminal (base) of transistor 114 is coupled to the clock signal 112.

The current flow terminals of transistor 120 are coupled between circuit ground and one of the current flow terminals of transistor 118. The control terminal of transistor 120 also is coupled to the clock signal 112, but through an inverter 122. The control terminals of transistors 116 and 118 are both coupled to the bus bit line through inverter 124. The current flow terminals of transistor 116 are coupled between transistor 114 and node 130. The current flow terminals of transistor 118 are coupled between transistor 120 and node 130. Transistors 116 and 118 are complementary to each other where transistor 116 is of the same type as transistor 114 and transistor 118 is of the same type as transistor 120.

In accordance with the invention, the bus driving protocol is that any given bus driver that drives the bus drives it during the first half (or phase) of the bus clock cycle and then turns off. The bus keeper 100 then maintains during the second phase of the bus clock cycle the logic level that had been driven by the driver during the first phase of the clock cycle. At the end of the second phase of the clock cycle (at the leading edge of the next clock cycle), the bus driver stops driving the bus. With this scheme, power is conserved and there is no bus contention between drivers of two different devices or between a device driver and the bus keeper. With reference to FIG. 1, the bus keeper operates as follows. In this example, the leading edge of each clock cycle is a rising edge and the clock has a 50% duty cycle.

However, neither of these conditions is a requirement of the invention. At the rising edge of a clock cycle, a device that is requesting access to the bus is selected according to some protocol and the selected driver (in this case driver 104) is issued an enable pulse. The enable pulse is slightly delayed from the rising edge of the clock due to circuit delay and is of the duration of half a clock cycle. Accordingly, driver 104 drives the bus with data for one half of a clock cycle commencing slightly after the leading edge of the clock cycle.

In response to the logic high level of the clock existing during the first half of the clock cycle, the bus keeper operates as a storage node. Particularly, transistors 114 and 120 are directly controlled by the clock and when the clock signal 112 is high, transistors 114 and 120 are turned off (they do not conduct) such that the node is electrically decoupled from both of the voltage sources VDD and ground. Accordingly, node 130 is driven to the logic level of the data on the bus via connection 132.

Also, inverter 124 inverts the logic level on the bus and feeds it to the control terminals of transistors 116 and 118. Since transistors 116 and 118 are complementary, one of transistors 116 and 118 will be turned on and the other will be turned off. Particularly, if the bus data during the cycle is logic high, then the output of inverter 124 will be logic low. Therefore, transistor 116 will be turned on while transistor 118 will be turned off. If the bus data is logic low, then transistor 116 is turned off and transistor 118 is turned on.

Responsive to the falling edge of the clock cycle (halfway through the clock cycle) and the ensuing low logic level of the clock, driver 1 is disabled. Also responsive to the falling edge and ensuing logic low level of the clock, transistors 114 and 120 are turned on. Thus, during the second half of the clock cycle, node 130, which is directly coupled with the bus bit line via connection 132, will be driven to either VDD or ground depending on which of transistors 116 and 118 was on during the first half of the clock cycle. For instance, if, during the first half of the clock cycle, the bus driver 104 drove the bus to a logic high level, then, as previously discussed, transistor 116 is turned on and transistor 118 is turned off. Accordingly, during the second half of the bus clock cycle, node 130, and thus the bus bit line will be electrically coupled to VDD through transistors 114 and 116. In other words, the bus keeper will continue to hold the bus at the logic high level during the second half of the clock cycle.

If, on the other hand, the bus was driven to a low logic level by driver 104 during the first half of the clock cycle, then transistor 118 will be turned on during the second half of the clock cycle, rather than transistor 116, so that the bus keeper will continue to drive the bus at a low logic level (ground) during the second half of the clock cycle through transistors 118 and 120, both of which are turned on during the second half of the clock cycle. At the rising edge of the next clock cycle, transistors 114 and 120 will be turned off again. Accordingly, the bus keeper will no longer drive node 130 and the next bus driver can drive new data onto the bus without needing to overcome the bus keeper.

Figure 2:
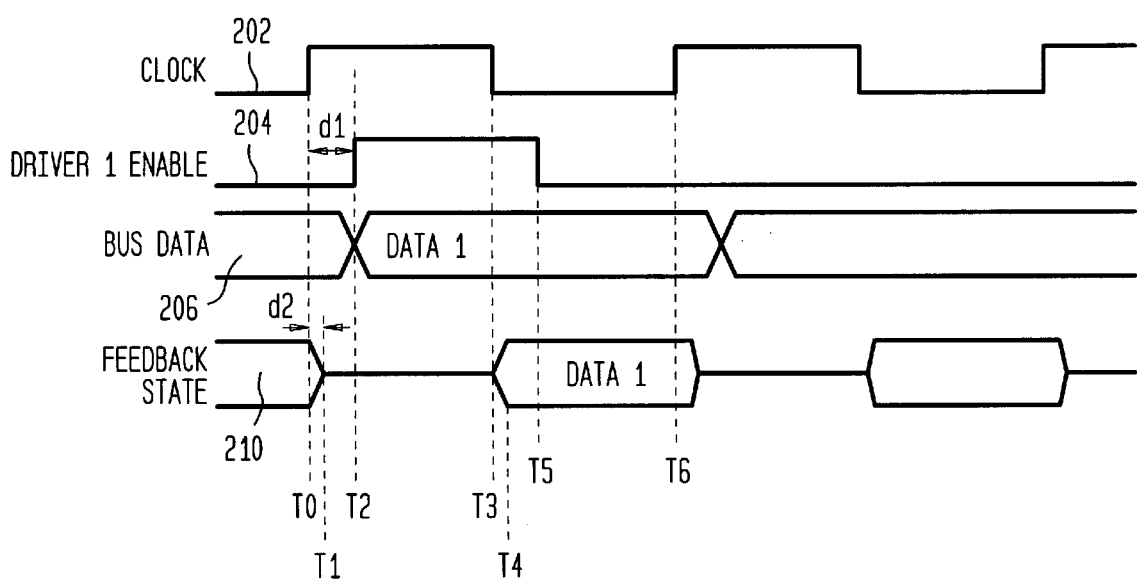
FIG. 2 is a timing diagram illustrating bus timing in accordance with the circuit of FIG. 1.

FIG. 2 is a timing diagram illustrating bus timing in accordance with the present invention. As shown on time line 202, the rising (leading) edge of a clock cycle occurs at time T0. At time T1, a short delay period after the rising edge of the clock, the bus driver enters the storage state, as shown on line 210. A slightly longer delay period later, at time T2, the selected driver is enabled (line 204) for the duration of half a clock cycle. Accordingly, also commencing at time T2, as shown on time line 206, the bus is driven with the data from the selected driver.

At time T3, the clock cycle falling edge arrives (time line 202). Also at time T3, the bus keeper starts to enter its feedback state in order to drive the bus to the same logic level that existed during the first half of the clock cycle. The bus keeper is fully in the feedback state by time T4. A slight longer delay thereafter, at time T5, driver 1 is disabled (see line 204). At the next rising edge of the clock at time T6, the bus keeper stops driving the bus and the cycle starts all over again. Accordingly, the bus is continuously driven with the same logic level from time T2 to the next rising edge of the clock at time T6 (and, in fact, slightly beyond.

It will be clear to those of skill in the art that there are many other transistor configurations that can be used to implement the present invention and that FIG. 1 is merely one exemplary embodiment for an exemplary set of conditions.

As can be seen from the description above, the bus keeper is clocked so as to only drive the bus during the second phase of the bus clock cycle while the bus drivers drive the bus only during the first half of the bus clock cycle. Accordingly, there is no contention between the bus keeper and various bus drivers. Thus, the bus can operate faster because there is no need for the bus drivers to overcome the bus keeper before the driven data becomes valid. Further, the avoidance of contention between the bus drivers and the bus keeper prevents power dissipation via what would otherwise be a momentary low impedance path between power and ground whenever the data on the bus changes. Further, since there is virtually no contention between the bus keeper and the bus driver in accordance with the present invention, the bus keeper of the present invention can use stronger output transistors and, therefore, have better noise immunity than prior art bus keepers. Specifically, unlike prior art bus keepers, the size of the feedback transistors do not have to be reduced in size relative to the transistors of the bus drivers.

One important constraint of the present invention is that either a valid or default driver must always drive the bus during the first half of the clock phase in order to avoid floating nodes or the first phase of the bus cycle must be short enough that the bus does not float between the active periods of the bus keeper when a driver is not actively driving the bus. These constraints, however, are not particularly demanding because, for most applications, it is quite feasible to either (1) guarantee that a driver is activated for any combination of driver select signals or (2) keep the bus cycle sufficiently brief to avoid floating node problems during the first phase of the clock cycle.

The clocked bus keeper of the present invention is connected directly to the bus clock. Accordingly, it will easily shut off (responsive to the leading edge of the clock cycles before any bus driver turns on. Particularly, the output enables of the bus drivers will be delayed at least by the propagation delay of a flip flop. Accordingly, the low clock skew associated with the bus keeper and the delay on asserting the output enable of the bus drivers assures that there will be virtually no bus contention between the bus drivers and the bus keeper.

Further, the clocked bus keeper of the present invention works across process and temperature variations. Further, it works well at low voltages, whereas prior art bus keepers tend to have problems operating in low voltage circuits. Further, the clocked bus keeper of the present invention will work during stopped clock and slowed clock operations (so long as there is always a default driver on the data bus). Additionally, because the clocked bus keeper of the present invention is generally scalable and does not have to be made weaker than the bus drivers of the circuit, the clocked bus keeper can be easily migrated to new circuit designs via a dumb shrink.

The clocked bus keeper of the present invention can be easily designed to meet all operating conditions because there is virtually no contention with the bus drivers. Specifically, the bus voltage for prior art bus keepers is the supply voltage divided across the p and n transistors that are trying to control the bus. Thus, the transistor size used in prior art bus keepers must be balanced so that the bus voltage will meet the VDD-$V_{TP}$ or VDD-$V_{TN}$ threshold requirements over process variations, temperature and supply voltage range. That problem does not exist with respect to the clocked bus keeper of the present invention because there is no bus contention with the bus keeper.

The clock gated bus keeper of the present invention can be used with conventional PCB busses as well as the busses of systems-on-a-chip.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of driving a bus with data, said method comprising the steps of:
    (1) clocking said bus with a clock having a clock cycle comprising a first transition edge followed by a phase having a first logic level and a second transition edge followed by a phase having a second logic level;
    (2) turning a driver on to drive said bus with data responsive to said first edge of said clock cycle;
    (3) turning said driver off responsive to said second edge of said clock cycle;
    (4) turning a bus keeper off responsive to said first edge of said clock cycle; and
    (5) turning said bus keeper on responsive to said second edge of said clock cycle.

2. The method as set forth in claim 1 wherein said bus keeper is directly responsive to said clock.

3. The method as set forth in claim 1 wherein said bus comprises at least one bit line, said driver can alternately drive said bit line to a third logic level and a fourth logic level and wherein step (4) comprises:

(4.1) coupling a node of said bus keeper to said bit line of said bus;

(4.2) allowing said node to align with the logic level driven onto said bus bit line by the driver during the first phase of the clock cycle;

(4.3) coupling said node to a first voltage source having said third logic level during said second phase of said clock cycle, if said bus was driven to said first logic level during the first phase of the corresponding clock cycle; and (4.4) coupling said node to second voltage source having said fourth logic level during said second phase of said clock cycle, if said bus was driven to said second logic level during the first phase of the corresponding clock cycle.

4. The method as set forth in claim 3 wherein step (4.3) comprises;

(4.3.1) coupling said node to said first voltage source through a first transistor circuit;

(4.3.2) turning said first transistor circuit off during said first phase of said clock cycle so that said node is not coupled to said first voltage source; and (4.3.3) turning said first transistor circuit on during said second phase of said clock cycle so that said node is coupled to said first voltage source, if a logic level on said bus at said second edge of said clock cycle is said third logic level;

and wherein step (4.4) comprises (4.4.1) coupling said node to said second voltage source through a second transistor circuit;

(4.4.2) turning said second transistor circuit off during said first phase of said clock cycle so that said node is not coupled to said second voltage source; and (4.4.3) turning said second transistor circuit on during said second phase of said clock cycle so that said node is coupled to said second voltage source, if a logic level on said bus at said second edge of said clock cycle is said second logic level.

5. The method as set forth in claim 4 wherein said first and third logic levels are the same and said second and fourth logic levels are the same.

6. A method of driving a bus with data, said method comprising the steps of:

(1) clocking said bus with a clock having a clock cycle comprising a first phase having a first logic level and a second phase having a second logic level;

(2) turning a driver on to drive said bus with data during said first phase of said clock cycle;

(3) turning said driver off during said second phase of said clock cycle;

(4) turning a bus keeper on during said second phase of said clock cycle; and (5) turning said bus keeper off during said first phase of said clock cycle.

7. The method as set forth in claim 6 wherein said bus keeper is directly responsive to said clock.

8. The method as set forth in claim 6 wherein said bus comprises at least one bit line, said driver can alternately drive said bit line to a third logic level and a fourth logic level and wherein step (4) comprises:

(4.1) coupling a node of said bus keeper to said bit line of said bus;

(4.2) allowing said node to align with the logic level driven onto the bus bit line by the driver during the first phase of the clock cycle;

(4.3) during said second phase of said clock cycle, coupling said node to one of a first voltage source having said third voltage level and a second voltage source having said fourth logic level, responsive to said bus having been driven to said third logic level or said fourth logic level during the first phase of the corresponding clock cycle, respectively.

9. The method as set forth in claim 8 wherein step (4.3) comprises;

(4.3.1) coupling said node to said first voltage source or said second voltage source through a first transistor circuit and a second transistor circuit, respectively;

(4.3.2) turning said first and second transistor circuits off during said first phase of said clock cycle so that said node is not coupled to said first voltage source or said second voltage source; and (4.3.3) turning said first transistor circuit on during said second phase of said clock cycle so that said node is coupled to said first voltage source, if a logic level on said bus at said second edge of said clock cycle is said third logic level and turning said second transistor circuit on during said second phase of said clock cycle so that said node is coupled to said second voltage source, if a logic level on said bus at said second edge of said clock cycle is said fourth logic level.

10. A bus keeper circuit for a bus circuit, said bus circuit comprising at least a first bus bit line that can be driven to a first or a second logic level and a bus clock having a clock cycle comprising a first transition edge followed by a first phase and a second transition edge followed by a second phase, said bus keeper circuit comprising:

a node coupled to said bus bit line;

a first circuit coupled between said node and a first voltage source producing a voltage equal to said first logic level;

a second circuit coupled between said node and a second voltage source producing a voltage equal to said second logic level;

said first and second circuits being responsive to said clock phase such that said first and second circuits decouple said node from said first and second voltage sources, respectively, during said first phase of said clock cycle such that said node aligns with said voltage on said bus bit line;

said first and second circuits further being responsive to said bus bit line such that one of said first and second circuits is turned on so as to electrically couple said node to one of said first and second voltage sources, respectively, responsive to said logic level on said bus bit line at said second transition of said clock cycle.

11. The bus keeper circuit as set forth in claim 10 wherein said node is coupled directly to said bus bit line.

12. The bus keeper circuit as set forth in claim 11 wherein each of said first and second circuits comprise first and second transistors having their current flow terminals coupled in series between said corresponding voltage source and said node and wherein each of said first transistors has a control terminal coupled to said clock such that said transistor is turned off responsive to said clock being in said first phase.

13. The bus keeper circuit as set forth in claim 12 wherein said control terminal of at least one of said first transistors is coupled directly to said clock.

14. The bus keeper circuit as set forth in claim 12 wherein each of said second transistors has a control terminal coupled to said bus bit line such that said first logic level on said bus bit line turns said second transistor of said first circuit on and said second transistor of said second circuit off and said second logic level on said bus bit line turns said second transistor of said first circuit off and said second transistor of said second circuit on;

whereby, during said second phase of said clock cycle, said node is coupled to the one of said first and second voltage sources that corresponds to said logic level on said bus bit line at said second transition of said clock cycle.

15. The bus keeper circuit as set forth in claim 14 further comprising a first inverter coupled between said bus bit line and said control terminals of said second transistors of said first and second circuits.

16. The bus keeper circuit as set forth in claim 15 further comprising a second inverter coupled between said clock and said control terminal of one and only one of said first transistor of said first circuit and said first transistor of said second circuit.

17. The bus keeper circuit as set forth in claim 10 wherein said bus keeper circuit is embodied on a system-on-a-chip integrated circuit.

18. A bus keeper circuit for a bus circuit, said bus circuit comprising at least a first bus bit line that can be driven to a first or a second logic level and a bus clock having a clock cycle comprising a first transition edge followed by a first phase having a third logic level and a second transition edge followed by a second phase having a fourth logic level, said bus keeper circuit comprising:

a node coupled to said bit line of said bus;

a first transistor having a control terminal coupled to said bus bit line, a first current flow terminal coupled to said node, and a second current flow terminal;

a second transistor having a control terminal coupled to said clock, a first current flow terminal coupled to a first voltage source producing a voltage having said first voltage level, and a second current flow terminal coupled to said second current flow terminal of said first transistor;

a third transistor having a control terminal coupled to said bus bit line, a first current flow terminal coupled to said node, and a second current flow terminal;

a fourth transistor having a control terminal coupled to said clock, a first current flow terminal a second voltage source producing a voltage having said second voltage level and, a second current flow terminal coupled to said second current flow terminal of said third transistor;

wherein said control terminals of said second and fourth transistors are coupled to said clock such that said transistors are turned off responsive to said clock being in said first phase and turned on responsive to said clock being in said second phase; and wherein said control terminals of said first and third transistors are coupled to said bus bit line such that said first logic level on said bus turns on said first transistor and turns off said third transistor and said second logic level on said bus turns off said first transistor and turns on said third transistor.

19. The bus keeper circuit as set forth in claim 18 wherein said control terminal of said second transistor is coupled directly to said clock and said control terminal of said fourth transistor is coupled to said clock through a first inverter.

20. The bus keeper circuit as set forth in claim 19 wherein said control terminals of said first and third transistors are coupled to said bus through a second inverter.

21. The bus keeper circuit as set forth in claim 20 wherein said first and third transistors are complementary.

22. The bus keeper circuit as set forth in claim 21 wherein said second and fourth transistors are complementary.

23. The bus keeper circuit as set forth in claim 22 wherein said first and second transistors are of the same type.

24. The bus keeper circuit as set forth in claim 23 wherein said first and second transistors are n-type transistors and said third and fourth transistors are p-type transistors.

25. The bus keeper circuit as set forth in claim 24 wherein said bus keeper circuit is embodied on a system-on-a-chip integrated circuit.

26. The bus keeper circuit as set forth in claim 18 wherein said bus keeper circuit is embodied on a system-on-a-chip integrated circuit.

* * * * *